UNITED STATES PATENT OFFICE.

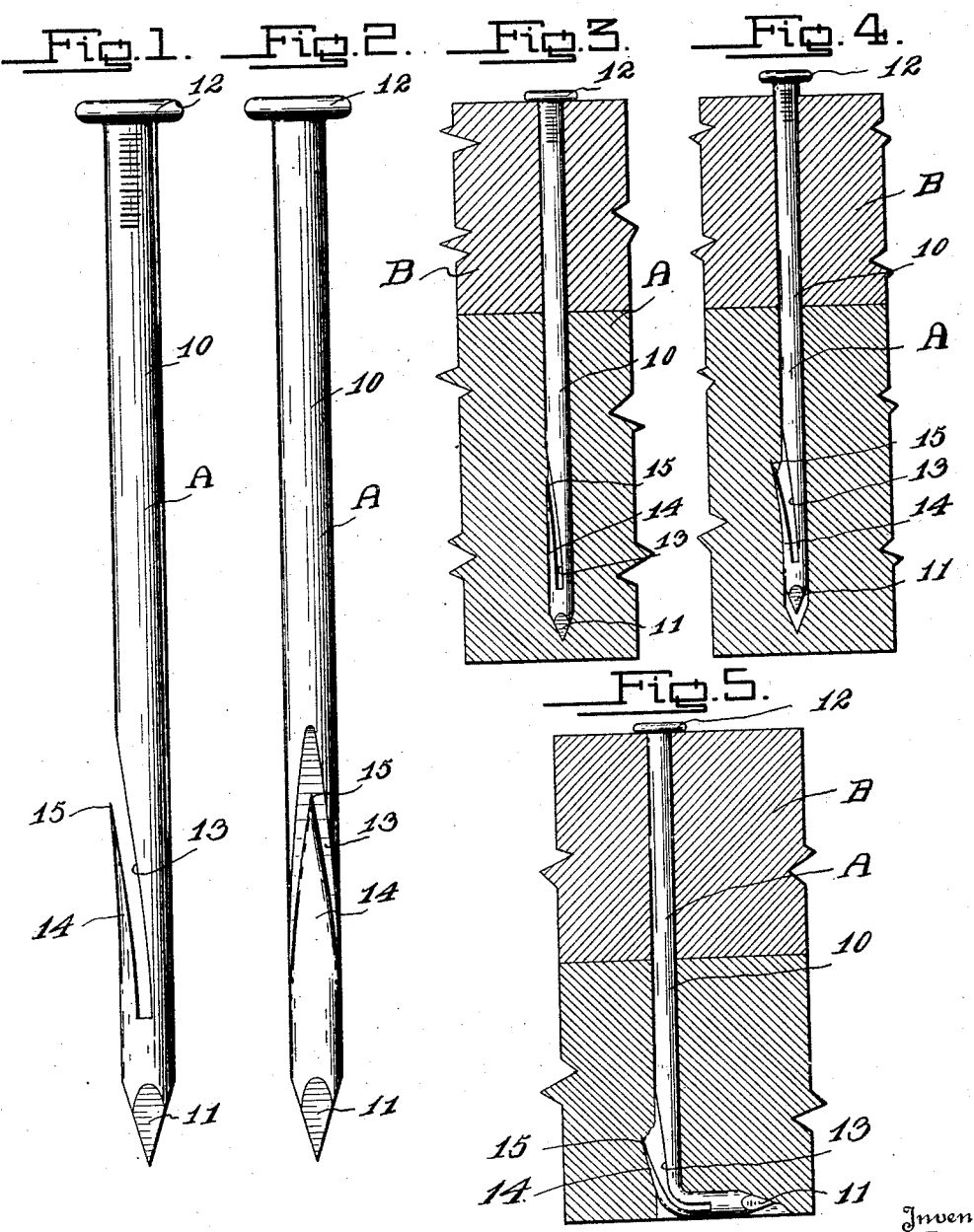

WILLIAM K. FROST, OF HOLLYWOOD, CALIFORNIA.

NAIL.

1,417,818.

Specification of Letters Patent.   Patented May 30, 1922.

Application filed June 7, 1921. Serial No. 475,672.

*To all whom it may concern:*

Be it known that I, WILLIAM K. FROST, a citizen of the United States, residing at Hollywood, in the county of Los Angeles and State of California, have invented certain new and useful Improvements in Nails, of which the following is a specification.

This invention relates to fastening elements, such as staples, nails, spikes and the like, and the primary object of the present invention is to provide a novel fastening element of this character, which is so constructed that the withdrawal thereof through accident or design from the work will be precluded, thereby insuring the effective holding of the work with which the fastening element is associated.

A further object of the invention is to provide a nail having a shank provided with an integral resilient tongue, which is adapted to flex during the driving of the nail into the work, whereby the nail can be readily and easily driven into place, and to expand or resume its normal position after the driving of the nail, thereby permitting the effective engagement of the fibers of the wood, whereby accidental creeping of the nail from out of the work is prevented.

A further object of the invention is to provide a fastening element embodying a shank having an inwardly extending inclined slot formed therein, providing a resilient tongue, which is adapted to engage the fibers of the wood to prevent the withdrawal of the fastening element from the work, the slot also permitting the ready clinching of the nail, when necessary or desirable.

A still further object of the invention is to provide an improved fastening element of this character, which is durable and efficient in use, one that is simple and easy to manufacture, and one which can be placed upon the market at a minimum cost.

With these and other objects in view, the invention consists in the novel construction, arrangement and formation of parts, as will be hereinafter more specifically described, claimed and illustrated in the accompanying drawings forming a part of this specification, in which drawings;

Figure 1 is a side elevation of the improved fastening element.

Figure 2 is a similar view showing the fastening element turned at quarters in relation to Figure 1.

Figure 3 is a side elevation of the nail showing the same driven into the work, the work being shown in section.

Figure 4 is a view similar to Figure 3, showing the position of the locking tongue when an effort is made to withdraw the nail from the work.

Figure 5 is a view similar to Figures 3 and 4 illustrating the configuration of the nail after the same has been clinched.

Referring to the drawings in detail, wherein similar reference characters designate corresponding parts throughout the several views, the letter A indicates a fastening element, which has been shown in this instance to be a nail of the so called wire type, but it is to be understood that the same can be a spike, staple or any type of fastening element, of any size or configuration.

The nail A as shown includes a cylindrical shank 10 having the penetrating point 11 on one end, and the head 12 formed on its opposite end. The shank 10 adjacent to the penetrating point 11 thereof is provided with an outwardly extending inwardly inclined slot 13. This slot 13 terminates short of the penetrating point, and ends substantially at the longitudinal center of the shank. This slot 13 defines a tongue 14, which owing to the inherent qualities of the material from which it is formed, is resilient, whereby the same will readily engage the fibers of the wood, in which it is driven, whereby the accidental withdrawal of the nail will be absolutely precluded. Owing to the formation of the slot 13, the inner end of the tongue 14 will be provided with a relatively sharp penetrating point 15, which facilitates the engagement of the tongue with the wood fibers.

In some instances where the shank of the fastening element is not circular in cross section, the sides of the penetrating tongue 14 will have to be tapered in order to provide the point 15, as is readily apparent.

By referring to Figure 3 of the drawings, it can be seen that when the nail A is driven into the work, designated by the letter B, the tongues 14 will lie within the plane of the outer surface of the shank 10, and thus the nail can be readily and easily driven into the work. It can be seen that when the nail has been driven fully into the work, the tongue 14 will expand or resume its normal position, as will also the work fibers, thus forming a contact between the point 15 of the tongue and the wood fibers. This absolutely prevents creeping of the nail or the withdrawal thereof from the work.

If an attempt is made to withdraw the nail from the work, it can be seen that the tongue 14 will be bent outwardly, as clearly shown in Figure 4 of the drawings, and thus dig deeper into the wood fibers, which will cause the nail to hold its position in the work.

If in some instances, it is desirable to clinch the nail, it is merely necessary to give the outer end thereof a few blows with a hammer, and the shank 10 will readily bend at the slotted portion 13 thereof, caused by the reduced sectional area of the shank at this point. This will cause the tongue 14 to be moved further into engagement with the wood fibers, and thus further prevent the withdrawal of the nail from the work.

This is clearly shown in Figure 5 of the drawings.

From the foregoing description, it can be seen that a simple fastening element has been shown, of durable construction, which will effectively prevent the parting of the work held by the fastening element.

Changes in details may be made without departing from the spirit or scope of this invention; but,

I claim:

1. A fastening element comprising a cylindrical shank having a penetrating point formed on one end thereof and an inwardly extending slot extending in from one side thereof toward the penetrating point, and terminating short thereof in substantial alignment with the longitudinal center of the shank, a resilient tongue defined by said slot, and a tapered penetrating point formed on said tongue.

2. In a fastening element, a shank having a penetrating point formed on one end thereof and provided with an inclined slot extending inwardly from one side thereof toward the penetrating point, a resilient tongue defined by the slot having its faces tapered to provide a relatively sharp penetrating point, the resiliency of the said tongue permitting the same to flex inwardly of the outer surface of the shank during the forcing of the shank into the work and the engaging of the fibers of the wood during the moving of the shank outwardly of the work.

WILLIAM K. FROST.